March 22, 1960
M. R. SMITH ET AL
2,929,773
HYDROCARBON CONVERSION SYSTEM
Filed Sept. 2, 1954
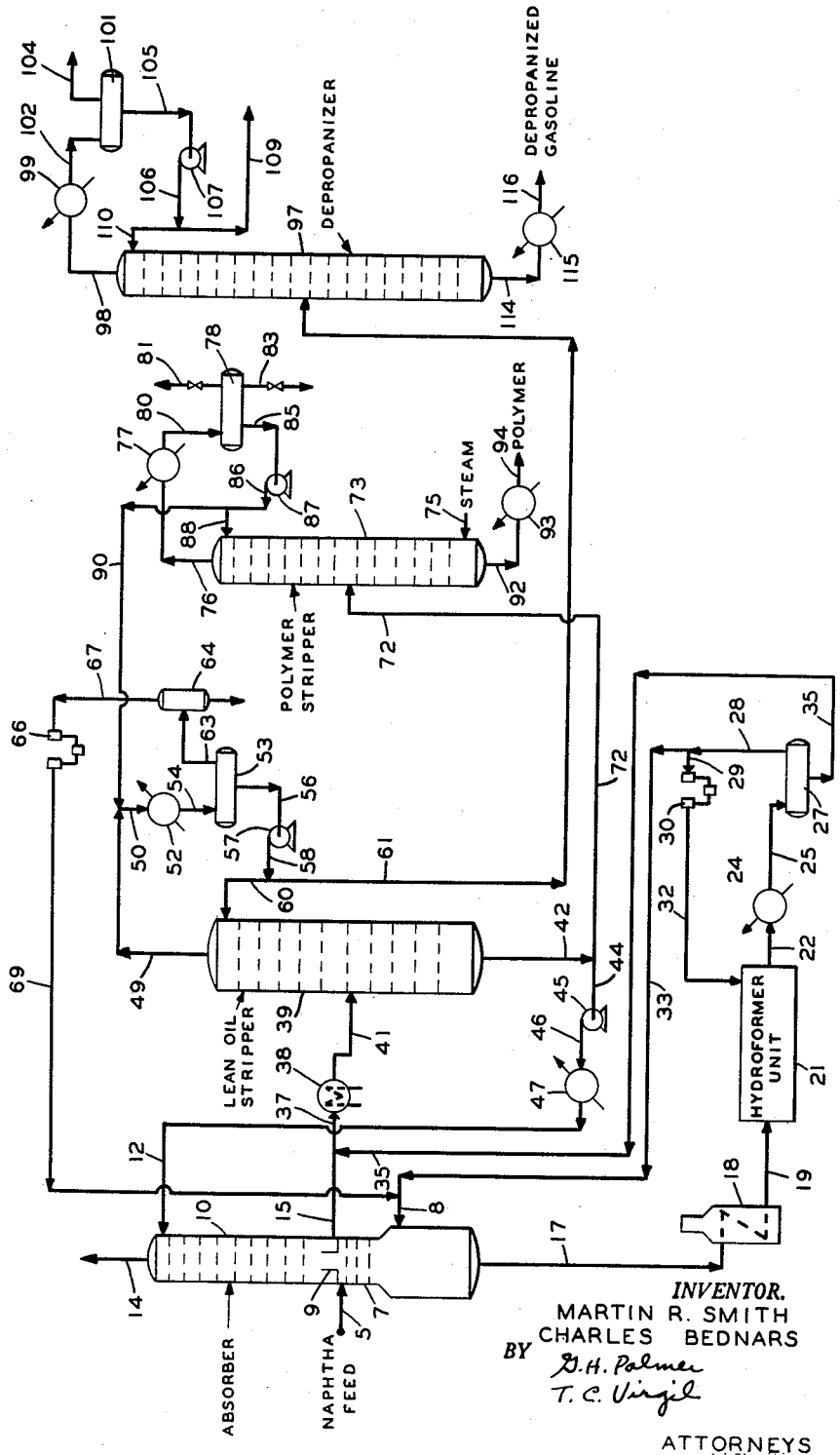
INVENTOR.
MARTIN R. SMITH
CHARLES BEDNARS
BY G. H. Palmer
T. C. Virgil
ATTORNEYS 2,929,773
Patented Mar. 22, 1960

2,929,773

HYDROCARBON CONVERSION SYSTEM

Martin R. Smith, Glen Ridge, N.J., and Charles Bednars, Port Washington, N.Y., assignors to The M. W. Kellogg Company, Jersey City, N.J., a corporation of Delaware Application September 2, 1954, Serial No. 453,887

6 Claims. (Cl. 208—101)

This invention relates to an improved hydroforming process and, more particularly, it pertains to a hydroforming process in which the product materials are recovered in an economical manner with a minimum loss thereof.

It is an object of this invention to provide an improved hydroforming process.

Another object of this invention is to provide a hydroforming process in which valuable gasoline components are recovered in an economical and efficient manner.

Other objects and advantages of this invention will become apparent from the following description and explanation thereof.

By means of this invention, it is contemplated effecting improvements in a hydroforming process where a light hydrocarbon oil is contacted with a hydroforming catalyst under suitable reforming conditions to produce a reformed product containing gasoline, polymer and normally gaseous product by the method which comprises contacting polymer with normally gaseous product containing gasoline components in an absorption zone thus enriching the polymer with said gasoline components, separating the normally gaseous product containing gasoline components from the aforesaid reformed gaseous product, passing separated normally gaseous product to the absorption zone, combining the enriched polymer with the remaining reaction product, passing the resultant mixture to a separation zone whereby polymer is separated therefrom, and passing a portion of the separated polymer to the absorption zone.

The system for recovering product materials is applicable to a hydroforming process wherein a light hydrocarbon oil is contacted with a reforming catalyst, the light hydrocarbon oil can be gasoline, naphtha or kerosene, and these materials either singly or in mixtures thereof can be derived from a straight run operation or a cracking operation. A light hydrocarbon oil has an initial boiling point of about 75° to about 340° F. and an end point of about 360° to about 475° F. On the other hand, a naphtha fraction usually has an initial boiling point of about 90° to about 220° F., and an end point of about 320° to about 450° F. The paraffinicity of the feed material is measured by the Watson characterization factor and in the present invention, it can vary from about 11.5 to about 12.2. The olefinic concentration by virtue that the feed material can be a straight run stock or cracked stock or mixtures of the two, may vary from about 0 to about 30 mol percent and, likewise, the octane number can be at least 20 CFRR clear and up to about 75 CFRR clear. The sulfur concentration of the feed material can vary from about 0 to about 2.5% by weight, more usually, about 0.01 to about 1% by weight. In the case of sulfur sensitive catalysts, such as, for example, a platinum catalyst, it is desirable to use a feed material containing not more than about 0.03% by weight of sulfur and, preferably, not more than about 0.01% by weight of sulfur. The presence of sulfur tends to deactivate the catalyst at a faster rate than is economical or desirable. Accordingly, it is also contemplated in this invention to subject the feed material to a desulfurization treatment and this desulfurization treatment can take place after the feed material has been used as an absorbing medium, before it is fractionated for the removal of heavy ends or following such separation treatment.

The catalytic material to be used in the hydroforming operation is one which has hydrogenation-dehydrogenation properties or it is capable of aromatizing hydrocarbon materials. In this regard, the reforming catalyst can be selected from a variety of materials such as, for example, the noble metals, e.g., platinum, palladium, etc.; the oxides and/or sulfides of metals of groups IV, V and VI of the periodic table, e.g., molybdenum trioxide, chromia, tungsten oxide, vanadium sulfide, etc.; the heteropoly acids in which the outer acid forming element is chromium, molybdenum, vanadium or tungsten and the central acid forming element is, for example, phosphorus, silicon, aluminum, platinum, germanium, etc., and specific examples of the heteropoly acids are, silicotungstic acid, phosphomolybdic acid, aluminomolybdic acid, etc. The catalytic elements enumerated above can be used alone or supported on a carrier material such as, for example, alumina, silica, alumina-magnesia, activated charcoal, pumice, kieselguhr, zinc aluminate, etc. The catalytic element constitutes about 0.01 to about 50% by weight of the total catalyst. However, in the case of a noble metal, e.g., platinum, it more usually constitutes about .05 to about 15% by weight. Specific examples of catalytic materials are platinum-alumina, palladium-alumina, molybdenum trioxide-alumina, alkalized chromia-alumina, cobalt molybdate-alumina, tungsten sulfide-alumina, etc.

The light hydrocarbon oil is contacted with the catalytic material under reaction conditions which are selected on the basis of providing a net production of hydrogen. The reaction temperature is about 750° to about 1075° F., more usually, about 850° to about 975° F. The total pressure is about 25 to about 1000 p.s.i.g., more usually, about 50 to about 750 p.s.i.g. The amount of oil charged to the reaction zone relative to the catalyst which is present therein is measured as the weight space velocity, i.e., the pounds of oil charged to the reaction zone per hour per pound of catalyst present therein. The weight space velocity can be from about 0.05 to 20, more usually, about 0.1 to about 10. The reaction is effected in the presence of added hydrogen and the hydrogen rate is about 500 to about 15,000, more usually, about 1000 to about 7500, standard cubic feet, measured at 60° F. and 760 mm. Hg, per barrel of oil feed, abbreviated at s.c.f.b. By virtue of the net production of hydrogen, the normally gaseous material containing about 50 to about 98% by volume of hydrogen is recycled to the hydroforming zone.

The reaction product which is produced from hydroforming operation includes three main product materials, namely, normally gaseous product, gasoline and polymer. The normally gaseous product is usually separated under essentially reaction pressure, consequently, it contains valuable gasoline components which, for the purpose of this specification and the appended claims, are to be understood as hydrocarbons containing at least four carbon atoms. In addition to the gasoline components, the normally gaseous product comprises hydrogen, methane, ethane, propane, propylene, etc. The gasoline material is the normally liquid product which has an end point varying in accordance with the needs of the time, generally, the gasoline product has an end point which may vary from about 375° to about 425° or even as high as 435° F. At present, the gasoline usually has an end point of about 400° to about 425° F. The remaining liquid product which boils above the gasoline product is termed as polymer. The initial boiling point of the polymer will vary in accordance with the end point of the gasoline material. The end point of the polymer can vary from about 500° to about 700° F. By virtue of the separation of the normally gaseous product from the normally liquid product under essentially reaction pressure, it is found that at equilibrium pertaining to the conditions existing in the separation zone, there is an appreciable amount of gasoline components which are present in the normally gaseous product. Consequently, provision is made to recover as much of the gasoline components as is economically feasible. In this invention the polymer material is used either alone or in combination with a light hydrocarbon material, e.g., the naphtha feed for the recovery of the gasoline components. Another important advantage in using the feed material as absorbent lies in the fact that the gaseous product serves to strip dissolved oxygen and water from the feed. Water tends to deactivate platinum catalyst whereas oxygen can cause preheater fouling due to promoting polymer formation. The enriched polymer is then combined with the normally liquid product and passed to a separation zone wherein the conditions are favorable for the removal of gasoline components from the polymer and inclusion in the gasoline material. The gaseous product from this operation is further treated, if desired, by absorption for the recovery of gasoline components, e.g., by the polymer product. The polymer fraction normally contains a large quantity of aromatics, hence, its absorptive properties can be improved by including therewith part of the gasoline product. In this connection about 2 to about 15 parts of gasoline product per part of polymer product, by volume, can be used in general. By increasing the absorptive properties of the polymer material, less absorbent is needed for the absorption of gasoline components from the normally gaseous product.

In order to provide a fuller understanding of the present invention, reference will be had to the accompanying drawing which provides a specific illustration thereof.

In the drawing, fresh naphtha feed having an API gravity of 58.2° is supplied by means of line 5 at the rate of 9000 barrels per day. The fresh feed is supplied to the lower absorption section 7 of the absorber wherein the material flows downwardly in countercurrent contact with upflowing normally gaseous product which is fed to the bottom of section 7 by means of line 8. The normally gaseous material passes upwardly through the opening of a donut tray 9 which serves to divide absorption section 7 from the upper absorption section 10. The fresh naphtha feed is charged to section 7 at a temperature of 100° F. and the pressure in section 7 is maintained at 230 p.s.i.g. A lean product fraction comprising gasoline and polymer is fed to the top of absorption section 10 by means of line 12 at a temperature of 100° F. This fraction comprising gasoline and polymer, which has an API gravity of 29.7° by virtue of the fact that its initial boiling point is about 300° F. and contains 8 parts of gasoline and 1 part of polymer, by volume, is fed to the absorption section 10 at the rate of 5715 barrels per day. Gaseous material substantially reduced of gasoline components is discharged from the top of the absorber via line 14. The fraction comprising gasoline and polymer descends downwardly through section 10 and thereby absorbs gasoline components from the upflowing gaseous material. In addition to recovering gasoline components which were originally present in the gaseous feed, this polymer also serves to recover any naphtha which has been vaporized and is present in the upflowing gaseous material. The enriched fraction comprising gasoline and polymer is discharged from donut tray 9 by means of line 15.

The enriched naphtha feed is discharged from the bottom of section 7 by means of line 17 and it is charged to furnace 18 whereby its temperature is raised to 950° F. The vaporized naphtha is discharged from furnace 18 by means of line 19 and it is charged to a hydroformer unit shown schematically as 21. The naphtha feed is contacted with a platinum catalyst containing 0.6% by weight of platinum supported on alumina at an average temperature of 920° F., a weight space velocity of 1.0, a total pressure of about 330 p.s.i.g. and a hydrogen rate of about 5000 s.c.f.b. The reaction product is discharged from the hydroformer unit 21 by means of line 22 and it is cooled to a temperature of 100° F. by means of condenser 24. The cooled reaction product is discharged from the cooler 24 by means of line 25, and thereafter, it is passed to a separating drum 27. In the separating drum, the reaction product is at a temperature of 100° F. and a pressure of 235 p.s.i.g. The normally gaseous product is discharged from the top of drum 27 by means of line 28 and a portion thereof, namely, 4000 s.c.f.b., is recycled to the hydroformer unit by passing through line 29, compressor 30 and line 32. Compressor 30 serves to raise the pressure of the recycle gas in order to maintain the flow and the pressure condition within the hydroforming unit. The net production of normally gaseous product flows from line 28 to line 33 and thence, it enters the bottom of absorber section 7 by means of line 8. The normally gaseous product having a molecular weight of 8.74 is yielded at a rate of 10,017 pounds per hour. The normally liquid product having an API gravity of 52.6° is discharged from the bottom of separating drum 27 by means of line 35 at the rate of 7802 barrels per day.

The enriched fraction comprising gasoline and polymer flowing through line 15 from the absorber and the normally liquid product flowing through line 35 from drum 27 are combined and flow through line 37. The combined stream is raised to a temperature of 400° F. by means of heater 38, and thence, it flows to a lean oil stripper 39 by means of line 41. In the lean oil stripper, the top temperature is maintained at 365° F. and the bottom temperature is maintained at 480° F. at a pressure of 50 p.s.i.g. This lean oil stripper is a suitable fractionation tower in which the temperature is substantially greater than the temperature in the absorption column and the pressure is substantially reduced in order that lighter boiling gasoline components and lighter material can be readily stripped from the fraction comprising gasoline and polymer and adequate fractionation can be effected to produce a gasoline product substantially free of polymer material. A fraction comprising gasoline and polymer having an API gravity of 29.7° is discharged from the bottom of the lean oil stripper by means of line 42 at the rate of 6000 barrels per day. The recycle stream to the absorber comprising 5715 barrels per day passes through line 44. The recycle fraction comprising gasoline and polymer stream is transported by means of pump 45 and thence, it passes through line 46 prior to entering a cooler 47 wherein the temperature is lowered to 100° F. The cooled fraction comprising gasoline and polymer passes from the cooler 47 to line 12, and thence, it enters the top of absorption section 10. The overhead vaporous product from the lean oil stripper 39 passes through line 49, line 50, and thence it is cooled to a temperature of 100° F. by means of condenser 52. The cooled overhead product is passed from condenser 52 to a separating drum 53 by means of line 54. Separating drum 53 is maintained at a temperature of 100° F. and a pressure of 40 p.s.i.g. The gasoline product is discharged from the bottom of drum 53 by means of line 56, and it is pumped by means of pump 57 through line 58. A portion of the gasoline product having an API gravity of 54.6° in line 58 is recycled to the top of stripper 39 by means of line 60 at the rate of 2625 barrels per day. The remaining portion of gasoline in line 58 is passed to line 61 at the rate of 8156 barrels per day. The normally gaseous material in drum 53 passed overhead therefrom by means of line 63, and thence, it is passed to a liquid trap-out drum 64 before being compressed to a pressure of 240 p.s.i.g. by means of compressor 66. The gaseous material passes from trap-out drum 64 to compressor 66 by means of line 67. The compressed gaseous material having a molecular weight of 26.5 is charged to the bottom of absorption section 7 by means of line 69 at the rate of 841 pounds per hour.

The net yield of a fraction comprising gasoline and polymer from the bottom of stripper 39 is passed from line 42 to line 72, and thence, it enters the middle section of a polymer stripper 73, where the heavy gasoline components are separated from the true polymer which has an initial boiling point of 400–420° F. In the polymer stripper, the top temperature is 360° F. and the bottom temperature is 455° F. and the pressure is 8 p.s.i.g. It is to be noted that the pressure in the polymer stripper is lower than the pressure in the lean oil stripper, consequently, stripping action is enhanced by a reduction of pressure as well as heating of the material to an elevated temperature. To further aid in the stripping of gasoline from the polymer, high pressure steam is introduced into the bottom of stripper 73 at the rate of 760 pounds per hour. The overhead vaporous fraction is removed from the top of the tower by means of line 76 and is cooled to a temperature of 120° F. by means of condenser 77. The cooled overhead product is passed to a separating drum 78 by means of line 80. In separating drum 78, at 120° F. and atmospheric pressure, gaseous material is discharged from the top of the drum by means of a valved line 81. Water is discharged from the bottom thereof by means of a valved line 83 at the rate of 1.5 gallons per minute. The gasoline material which is stripped from the polymer is removed from drum 78 by means of line 85. This gasoline material is pumped from line 85 to line 86 by means of pump 87. The gasoline in line 86 is divided such that a portion, namely, 154 barrels per day having an API gravity of 31.4° is recycled to the top of the stripper 73 by means of line 88. The remaining gasoline passes through line 86 to line 90 at the rate of 575 barrels per day. The net production of gasoline from the polymer stripper flows to line 50 wherein it is combined with the gasoline product which is produced in the lean oil stripper. A net production of polymer is produced from the bottom of stripper 73 via line 92. This polymer is cooled to a temperature of 100° F. by means of cooler 93 prior to being yielded from the system through line 94.

The net production of raw gasoline from the lean oil stripper passes through line 61 to a depropanizer 97. In the depropanizer 97, the top temperature is 120° F. and the bottom temperature is 430° F. at a pressure of 260 p.s.i.g. The vaporous overhead product from the depropanizer passes through line 98 and then it is cooled to a temperature of 105° F. by means of condenser 99. The cooled overhead product is passed from condenser 99 to separating drum 101 by means of line 102. In the separating drum, the temperature is 105° F. at a pressure of 245 p.s.i.g. Normally gaseous material is discharged from separating drum 101 by means of line 104. The liquid in separating drum 101 is removed therefrom by means of line 105. This liquid is pumped from line 105 to line 106 by means of pump 107. A portion of the liquid is passed from line 106 to line 109 at the rate of 530 barrels per day having a density of 4.16 pounds per gallon. The remaining 3020 barrels per day of liquid is recycled to the top of depropanizer column 97 by passing from line 106 to line 110. The depropanized gasoline is yielded from the bottom of depropanizer 97 by means of line 114 and it is cooled to a temperature of 100° F. by means of cooler 115. The cooled depropanized gasoline is discharged from the system by means of line 116.

In order to provide heat to columns 39, 73 and 97, a portion of the liquid in the bottom of the tower is withdrawn, heated, and recirculated thereto. Such reboiling means are not shown in the drawing.

Having thus provided a written description of our invention, it should be understood that no undue limitations or restrictions are to be imposed by reason thereof, but that the scope of the present invention is defined by the appended claims.

We claim:

1. In a reforming process in which a light hydrocarbon oil feed is passed in contact with a catalyst in a reaction zone under reforming conditions to produce a reformed reaction product including gasoline, polymer and gaseous product, the improvement which comprises passing all of the reformed reaction product to a first separation zone, separating under pressure in said first separation zone a gaseous product fraction containing low-boiling gasoline components from the remainder of said reformed reaction product, passing gaseous product from said first separation zone to a first absorption zone, in said first absorption zone contacting a light hydrocarbon oil feed with said gaseous product fraction containing gasoline components to enrich by absorption said light hydrocarbon oil feed with said gasoline components, passing enriched hydrocarbon oil feed to said reforming zone, removing a gaseous product from said first absorption zone, passing the remainder of said reformed reaction product from said first separation zone to a second separation zone, in said second separation zone separating a liquid fraction comprising polymer and from about 2 to about 15 parts by volume of gasoline per part of polymer, passing a portion of said separated fraction comprising polymer and gasoline from said second separation zone to a second absorption zone, in said second absorption zone contacting the gaseous product from said first absorption zone with a portion of said polymer fraction containing from about 2 to about 15 parts of gasoline per part of polymer, thereby enriching said polymer fraction with gasoline components and passing the enriched polymer fraction from said second absorption zone to said second separation zone.

2. In a reforming process in which a light hydrocarbon oil is passed in contact with a reforming catalyst in a reforming zone under reforming conditions to produce a reaction product containing gasoline, polymer and normally gaseous product, the improvement which comprises passing the total reaction product from the reforming zone to a first separation zone, separating a normally gaseous product fraction containing gasoline components from the remainder of said reaction product in said first separation zone, passing a portion of said normally gaseous product fraction from the first separation zone to a first absorption zone wherein said gaseous product fraction is passed in contact with a light hydrocarbon oil absorbent thereby enriching said light hydrocarbon oil with gasoline components, separating a gaseous stream containing gasoline components from said first absorption zone and passing the same to a second absorption zone wherein said separated gaseous stream is passed in contact with a product fraction absorbent comprising polymer and from about 2 to about 15 parts by volume of gasoline per part of polymer for enrichment of the same with gasoline components, passing the enriched fraction comprising polymer and gasoline from the second absorption zone to a second separation zone, passing the remaining reaction product from said first separation zone to said second separation zone, in said second separation zone separating a fraction comprising polymer and from about 2 to about 15 parts by volume of gasoline per part of polymer, a gasoline fraction and a normally gaseous product fraction containing gasoline components, passing a portion of the separated fraction comprising gasoline and polymer from the second separation zone as the absorbent to the second absorption zone, passing the normally gaseous product fraction separated in the second separation zone to the first absorption zone and passing enriched light hydrocarbon oil from the first absorption zone to the reforming zone.

3. In a reforming process in which a light hydrocarbon oil is passed in contact with a catalyst in a reforming zone under selected reforming conditions to produce a reaction product including gasoline, polymer and normally gaseous product, the improvement which comprises passing said reaction product to a first separation zone for the separation therefrom of a first normally gaseous product fraction containing gasoline components from the remainder of said reaction product, passing a portion of the first normally gaseous product fraction separated from the first separation zone to an absorption zone in contact with a reforming liquid product fraction absorbent comprising polymer and from about 2 to about 15 parts by volume of gasoline per part of polymer for enrichment of the same with gasoline components, passing the enriched fraction comprising polymer and gasoline from said absorption zone to a second separation zone, passing the remaining reaction product from said first separation zone to said second separation zone, in said second separation zone separating a fraction comprising polymer and from about 2 to about 15 parts by volume of gasoline per part of polymer, a gasoline fraction and a second gaseous fraction containing gasoline components, passing a portion of the fraction comprising polymer and gasoline from the second separation zone as the absorbent to the absorption zone, passing the remaining portion of the fraction comprising polymer and gasoline from the second separation zone to a stripping zone wherein a gasoline containing fraction is separated from a polymer fraction, recovering the gasoline containing fraction from the stripping zone and combining the same with the gasoline fraction separated in the second separation zone, and passing a gaseous stream comprising a portion of the second gaseous fraction separated from the second separation zone to the absorption zone.

4. The process of claim 3 in which a portion of the gaseous product fraction from the first separation zone is first contacted with a light hydrocarbon oil absorbent in a first absorption zone for the enrichment of the same with gasoline components, a gaseous stream is separated from said first absorption zone and passed to a second absorption zone wherein said gaseous stream is passed in contact with a liquid fraction comprising polymer and gasoline and the enriched hydrocarbon oil from the first absorption zone is passed to the reforming zone.

5. In a reforming process in which a light hydrocarbon oil is passed in contact with a catalyst in a reforming zone under selected reforming conditions to produce a reaction product containing gasoline, polymer and gaseous product, the improved method of operation which comprises passing all of the reformed reaction product to a first separation zone, separating under reforming pressure conditions a gaseous product fraction containing gasoline components from a liquid reaction product in said first separation zone, passing a portion of said gaseous product from said first separation zone to a first absorption zone and contacting said gaseous product in said first absorption zone with a light hydrocarbon oil thereby enriching said light hydrocarbon oil with gasoline components, separating a gaseous stream from said first absorption zone and passing the same to a second absorption zone wherein said gaseous stream is passed in contact with a liquid product fraction containing polymer, recovering a polymer containing fraction from said second absorption zone and passing the same to a second separation zone maintained at a higher temperature than said first separation zone, passing the liquid reaction product from said first separation zone to said second separation zone, in said second separation zone separating a polymer containing fraction from a gasoline-rich fraction and a gaseous product fraction containing gasoline components, passing a portion of the separated polymer containing fraction to the second absorption zone, passing the gaseous product fraction separated in the second separation zone to the first absorption zone and passing enriched light hydrocarbon oil from the first absorption zone to the reforming zone.

6. In a reforming process in which a light hydrocarbon oil is passed in contact with a catalyst in a reforming zone under reforming conditions to produce a reaction product containing gasoline, polymer and gaseous product, the improvement which comprises cooling said reaction product and passing the cooled reaction product to a first separation zone maintained at substantially reforming pressure conditions for the separation therein of a gaseous product fraction containing gasoline components from a liquid product fraction, passing a stream comprising a portion of the gaseous product fraction separated in the first separation zone to an absorption zone, in said absorption zone contacting said gaseous stream with a liquid product fraction containing polymer, recovering a polymer containing fraction from said absorption zone and passing the same with the liquid product fraction from said first separation zone to a second separation zone maintained at a lower pressure than said first separation zone, in said second separation zone separating a gasoline fraction containing polymer from a gasoline-rich fraction and a second gaseous fraction containing low boiling gasoline components, passing a portion of said polymer containing fraction from the second separation zone to the absorption zone, passing the remaining portion of said polymer containing fraction to a stripping zone wherein gasoline is separated from said polymer fraction, recovering separated gasoline from said stripping zone and said second separation zone as a combined product stream and passing a stream comprising a portion of said second gaseous stream from said second separation zone to said absorption zone.

References Cited in the file of this patent
UNITED STATES PATENTS

| | | |
|---|---|---|
| 2,377,736 | White | June 5, 1945 |
| 2,436,622 | Tyson | Feb. 24, 1948 |
| 2,484,381 | Johnson et al. | Oct. 11, 1949 |
| 2,485,073 | Shiffler et al. | Oct. 18, 1949 |
| 2,719,816 | Rich | Oct. 4, 1955 |
| 2,773,013 | Wolf et al. | Dec. 4, 1956 |

OTHER REFERENCES

Fulton: "Petroleum Engineer," vol. 29 (1950), pp. 109–112.